US012798756B2

(12) United States Patent
Vandersteen

(10) Patent No.: US 12,798,756 B2
(45) Date of Patent: Nov. 17, 2026

(54) AIRCRAFT HAVING A SYSTEM FOR ATTACHING AN ELEMENT TO A FUSELAGE AND HAVING A LIGHTNING PROTECTION SCREEN

(71) Applicant: Airbus Operations SAS, Toulouse (FR)

(72) Inventor: Marc Vandersteen, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 189 days.

(21) Appl. No.: 18/755,821

(22) Filed: Jun. 27, 2024

(65) Prior Publication Data

US 2025/0002134 A1 Jan. 2, 2025

(30) Foreign Application Priority Data

Jun. 29, 2023 (FR) ...................................... 2306863

(51) Int. Cl.
*B64C 1/40* (2006.01)

(52) U.S. Cl.
CPC .................................. *B64C 1/406* (2013.01)

(58) Field of Classification Search
CPC ...................................................... B64C 1/406
See application file for complete search history.

(56) References Cited

U.S. PATENT DOCUMENTS 7,898,785 B2 3/2011 Winter et al.
9,309,005 B2 * 4/2016 Warren ..................... F16B 5/02
2005/0103936 A1 * 5/2005 Pridham ................ B64D 45/02 244/119
2006/0273224 A1 * 12/2006 Hoffjann ............... B64C 1/1453 244/136
2012/0126054 A1 * 5/2012 Sequeiros Murciano .................. B64D 45/02 244/1 A
2012/0236457 A1 9/2012 Yamakoshi et al.
2014/0110526 A1 4/2014 De Azevedo et al.
2016/0172748 A1 * 6/2016 Keen ...................... H01Q 1/422 343/872
2018/0178928 A1 * 6/2018 Moupfouma ............ H01Q 1/28
2018/0362182 A1 * 12/2018 Tristant .................. B64D 45/02
2020/0001970 A1 * 1/2020 Douglas ................. B64D 37/10

OTHER PUBLICATIONS

French Search Report for corresponding French Patent Application No. 2306863 dated Jan. 25, 2024.

* cited by examiner

*Primary Examiner* — Scott Bauer
(74) *Attorney, Agent, or Firm* — Greer, Burns & Crain, Ltd.

(57) ABSTRACT

An attachment system for fastening an element to an aircraft fuselage, wherein the attachment system has a plate having a first face and a second face oriented towards the fuselage, and wherein the plate is fastened to the fuselage, a fitting fastened to the element and having a contact face in contact with the first face, and at least one fastening bolt having a screw and a nut, wherein the head of the screw is housed in the plate on the side of the second face, and wherein the nut is screwed to the screw, sandwiching the plate and the fitting. Also an aircraft with such an attachment system.

10 Claims, 4 Drawing Sheets

AIRCRAFT HAVING A SYSTEM FOR ATTACHING AN ELEMENT TO A FUSELAGE AND HAVING A LIGHTNING PROTECTION SCREEN

CROSS-REFERENCES TO RELATED APPLICATIONS

This application claims the benefit of French Patent Application Number 2306863 filed on Jun. 29, 2023, the entire disclosure of which is incorporated herein by way of reference.

FIELD OF THE INVENTION

The present invention relates to an aircraft having an attachment system with a fitting for fastening an element such as a pipe or a skid to a fuselage of the aircraft.

BACKGROUND OF THE INVENTION

An aircraft conventionally has a fuselage to which two wings are fastened and each wing supports at least one engine, in particular a jet engine. At the central part of the fuselage, the latter is covered with a belly fairing.

Certain elements are fastened to the outside of the fuselage, such as air pipes that run along the fuselage between the fuselage and the belly fairing. It may happen that one of these pipes is partly outside the belly fairing and is then in contact with external elements, such as the engines, and if lightning strikes the engine, an induced electric current can then flow through the pipe.

In order to prevent the current from propagating to the fuselage, or even to the inside of the latter, the fastening of the pipe to the fuselage requires the use of specific materials that may be relatively expensive.

It is therefore necessary to define an arrangement that makes it possible to reduce the cost necessary for fastening a fitting, in particular a metal fitting, to the outside of the fuselage while at the same time ensuring electrical insulation.

In the same way, in order to reduce the damage to the fuselage during a crash landing, for example without landing gear, skids are provided that are fastened to the outside of the fuselage, and these skids then slide on the tarmac. This sliding generates heating of the skid and it is therefore desirable to prevent this heating from being transmitted to the fuselage and to the inside thereof. In order to avoid this heating, specific and expensive materials are used.

It is therefore necessary to define an arrangement that makes it possible to reduce the cost necessary for fastening a fitting, in particular a metal fitting, to the outside of the fuselage while at the same time ensuring thermal insulation.

In general, it is necessary to find an arrangement that makes it possible to limit the passage of disturbances such as an electric current or a heat flow towards the fuselage.

SUMMARY OF THE INVENTION

An object of the present invention is to propose an aircraft having an attachment system with a metal fitting for fastening an element to the outside of the fuselage of the aircraft.

To this end, an aircraft having a fuselage, an element and at least one attachment system for fastening the element to the outside of said fuselage is proposed, the attachment system having:

- a plate having a first face, and a second face oriented towards the fuselage and wherein the plate is fastened to said fuselage,
- a metal fitting fastened to said element and having a shoe with a contact face in contact with the first face, and
- at least one fastening bolt having a screw and a nut, wherein the head of the screw is housed in the plate on the side of the second face and wherein the nut is screwed to the screw, sandwiching the plate and the shoe of the fitting.

With such an attachment system, this makes it possible to limit the passage of disturbances such as an electric current or a heat flow towards the fuselage by incorporating a buffer plate.

Advantageously, the plate is constituted of an electrically insulating material arranged to prevent the passage of current.

Advantageously, the plate is constituted of a thermally insulating material arranged to limit the passage of heat.

Advantageously, the attachment system has an intermediate plate disposed against the second face of the plate and intended to be disposed against the fuselage.

Advantageously, the intermediate plate is constituted of the same material as the material constituting the plate.

Advantageously, the plate is fastened to the fuselage by bolts, wherein each one has a screw with a head and a nut, for each bolt, the plate has a through-piercing and the fuselage has a through-orifice aligned with the piercing, for each bolt, the screw of said bolt passes through a piercing and the associated orifice so as to sandwich the plate and the fuselage between the head of the screw of said bolt and the nut of said bolt, and the piercings of the plate are arranged such that there is no contact between the shoe and the heads of the screws.

Advantageously, the plate is wider than the shoe and the piercings are on the outside of and at a distance from the shoe.

BRIEF DESCRIPTION OF THE DRAWINGS

The above-mentioned features of the invention, along with others, will become more clearly apparent upon reading the following description of one exemplary embodiment, said description being given with reference to the appended drawings, in which.

DETAILED DESCRIPTION OF THE PREFERRED EMBODIMENTS

Figure 1:
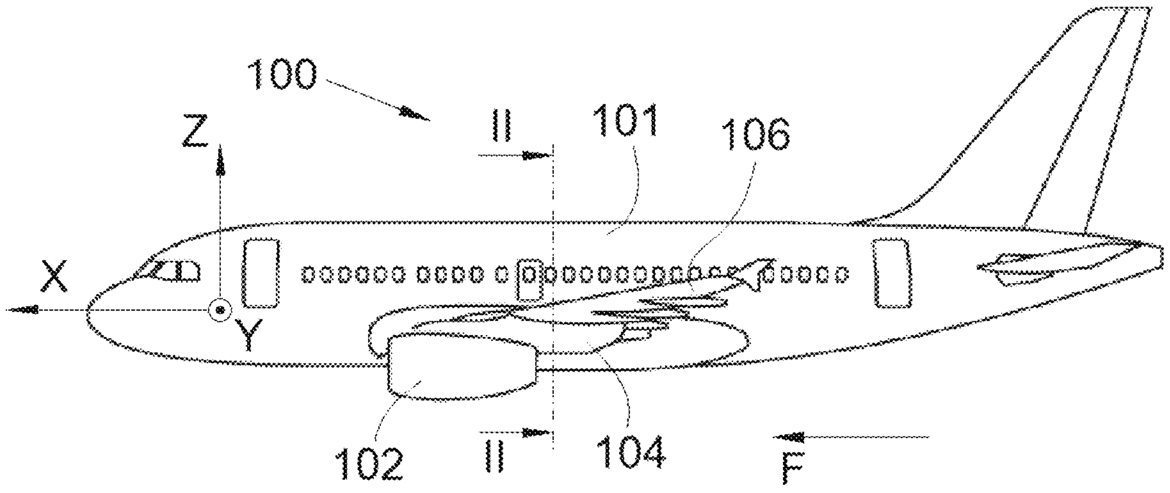
FIG. 1 is a side view of an aircraft according to the invention.

In the following description, terms relating to a position are considered in relation to an aircraft in a position of forward movement, i.e. as shown in FIG. 1, in which the arrow F represents the direction of forward movement.

FIG. 1 shows an aircraft 100 that has a fuselage 101 on either side of which is fastened a wing 106, each of which bears at least one engine 102, in particular a jet engine, in this case by way of an engine pylon 104.

In the following description, and by convention, the X direction is the longitudinal direction of the engine 102, with positive orientation in the direction of forward movement of the aircraft 100, the Y direction is the transverse direction of the aircraft 100, which is horizontal when the aircraft 100 is on the ground, and the Z direction is the vertical direction or vertical height when the aircraft 100 is on the ground, these three directions X, Y and Z being mutually orthogonal.

Figure 2:
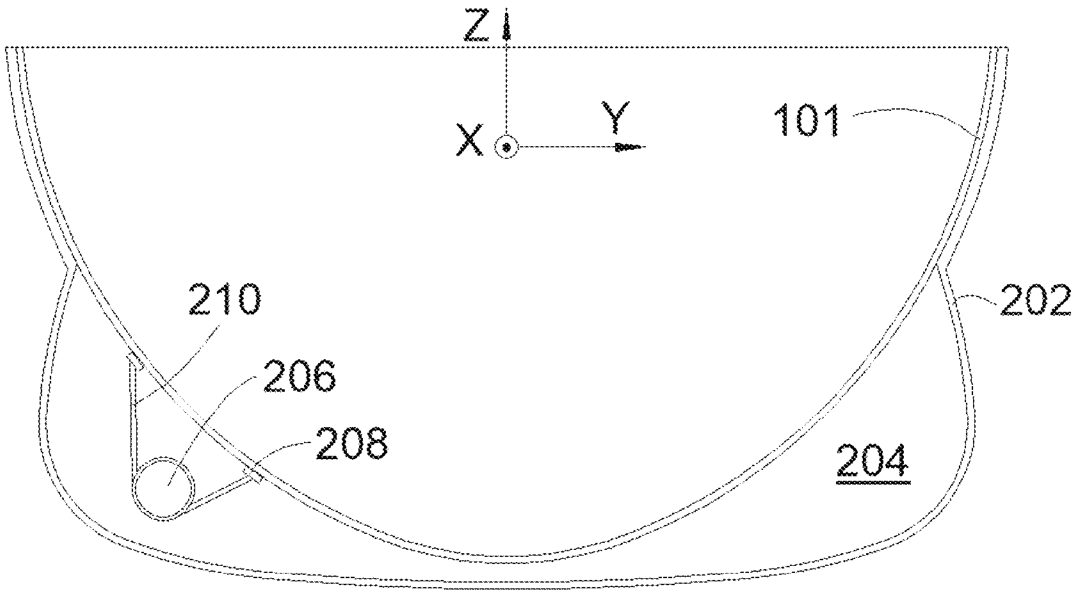
FIG. 2 is a view in partial cross section along the line II-II of the bottom part of the fuselage of the aircraft in FIG. 1.

FIG. 2 shows a cross section along a vertical plane of the fuselage 101. At the central part of the fuselage 101, the aircraft 100 has a belly fairing 202 that is as one with the fuselage 101 and that is on the outside of the latter so as delimit between them a space 204 in which at least one element 206 of the aircraft 100 is arranged. The belly fairing 202 makes it possible, inter alia, to protect the element 206 from direct lightning strikes.

In the embodiment of the invention that is presented here, the element 206 is a pipe, such as an air pipe supplying, for example, an engine 102, but it may be another element. For example, the element 206 may be a skid, intended to ensure that the aircraft 100 slides on the tarmac in the event of landing without landing gear, for example.

The element 206 is fastened to the fuselage 101 by at least one fitting 208 as one with the fuselage 101. In the embodiment of the invention that is presented in FIG. 2, the element 206 in this case has bars 210 that are fastened to the fittings 208.

Figure 3:
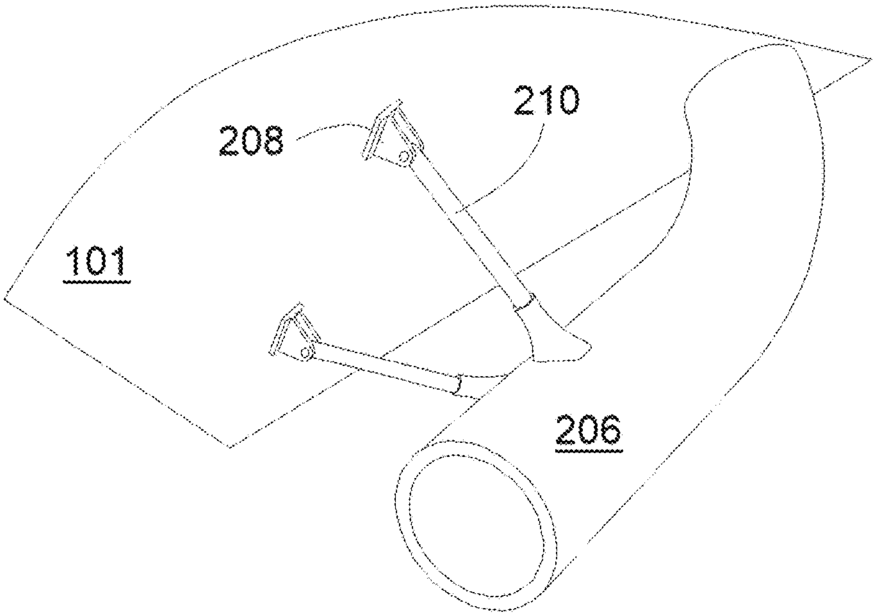
FIG. 3 is a perspective view of a particular installation of an attachment system according to the invention.

FIG. 3 shows the same elements as those in FIG. 2 but without the belly fairing 202.

Figure 4:
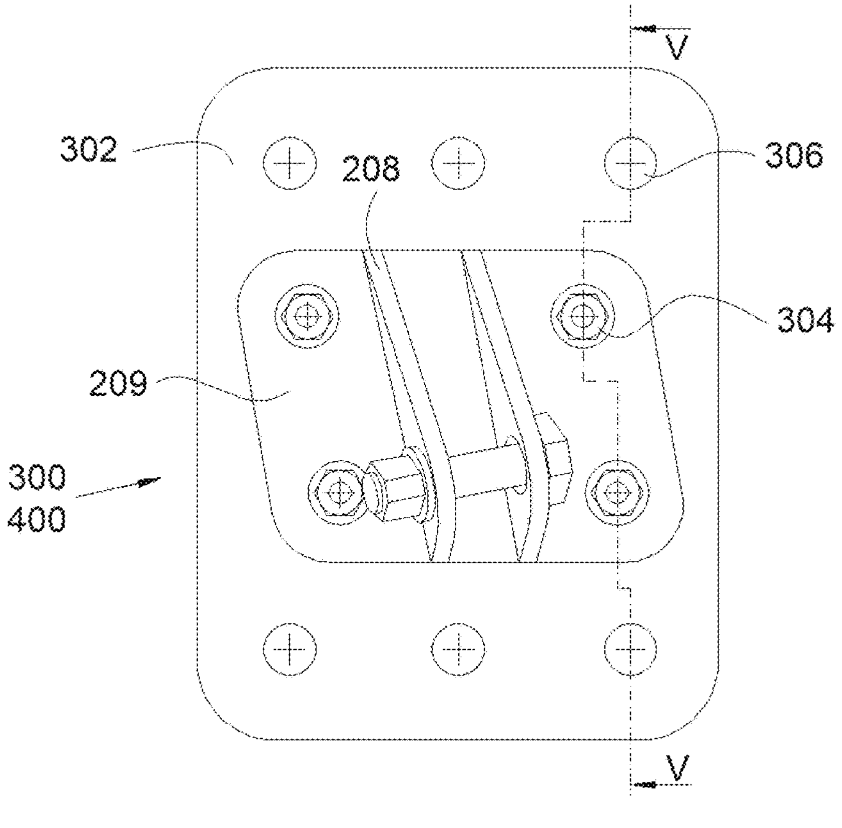
FIG. 4 is a view from above of an attachment system according to the invention.
Figure 5:
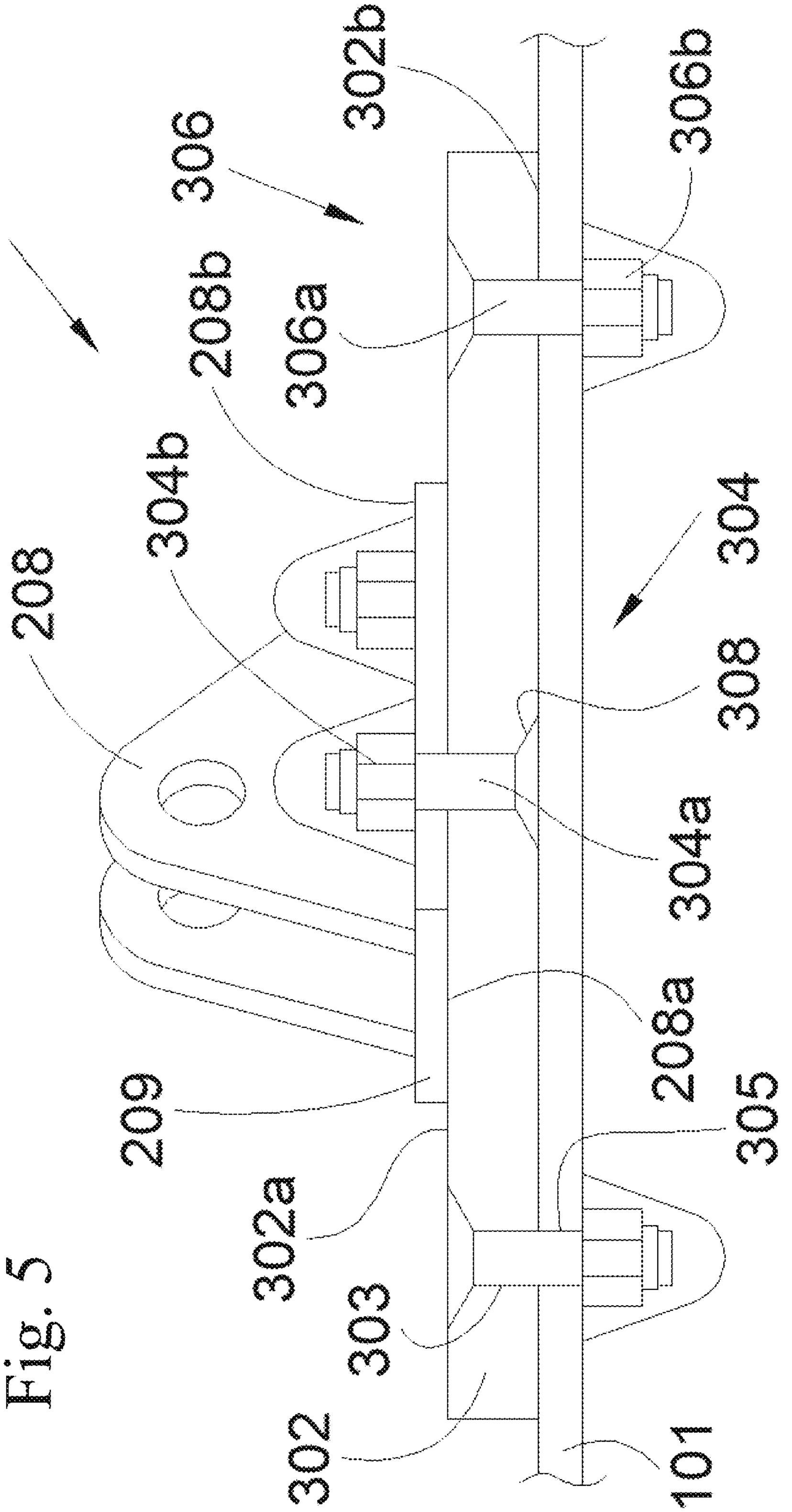
FIG. 5 is a view in cross section along the line V-V in FIG. 4 of an attachment system according to a first embodiment of the invention.

FIG. 4 shows an attachment system 300 according to a first embodiment of the invention and FIG. 5 shows the attachment system 300 in cross section.

The fitting 208 in this case takes the form of a female clevis in which the element 206 is fastened, in this case by way of a bar 210. The fitting 208 in this case has a shoe 209 that is in this case a flat wall that allows the fitting 208 to be fastened to the fuselage 101 using fastening bolts 304 described below.

The attachment system 300 has the fitting 208 and a plate 302.

The plate 302 has a first face 302*a* and a second face 302*b*. The second face 302*b* is oriented towards the fuselage 101 and on the outside of the latter.

The plate 302 is fastened to the fuselage 101 by any suitable fastening means, such as threaded fasteners, rivets, welding spots, etc.

In the embodiment of the invention that is presented here, the plate 302 is fastened to the fuselage 101 by way of a plurality of bolts 306, wherein each one has a screw 306*a* with a head and a nut 306*b*. To this end, the plate 302 has through-piercings 303 and the fuselage 101 has orifices 305 that are likewise through-orifices positioned in alignment with the piercings 303 when the plate 302 is pressed against the fuselage 101. For each bolt 306, the screw 306*a* of said bolt 306 passes through a piercing 303 and the associated orifice 305 and the plate 302 and the fuselage 101 are thus sandwiched between the head of the screw 306*a* of said bolt 306 and the nut 306*b* of said bolt 306. In the embodiment of the invention that is presented in FIG. 5, each screw head 306*a* is a countersunk head inserted into a countersunk bore of the plate 302 on the side of the first face 302*a* and the nut 306*b* bears against the fuselage 101. The bolts 306 do not pass through the fitting 208.

In order to prevent the passage of current or heat between the shoe 209 and the bolts 306, the piercings 303 in the plate 302 are arranged so that there is no contact between the shoe 209 and the heads of the screws 306*a* in the assembled position. In the embodiment of the invention that is presented here, the plate 302 is wider than the shoe 209 and the piercings 303 are on the outside of and at a distance from the shoe 209.

The shoe 209 of the fitting 208 has a contact face 208*a* that is in contact with the first face 302*a* of the plate 302. The plate 302 is thus between the fitting 208 and the fuselage 101.

The attachment system 300 also has at least one fastening bolt 304, wherein each one has a screw 304*a* and a nut 304*b*.

For each fastening bolt 304, the plate 302 has, on the side of the second face 302*b*, a hole 308 passing through the plate 302 and which, in the form illustrated, is in this case a countersunk hole, in which the head of the screw 304*a* is housed so as to be flush with the second face 302*b* which thus remains flat.

Each nut 304*b* is screwed to the associated screw 304*a*, sandwiching the plate 302 and the fitting 208. Each nut 304*b* is thus against a bearing face 208*b* that is the face of the shoe 209 opposite the contact face 208*a*.

With such an assembly, it is possible to protect the fuselage 101 from possible disturbances coming from the element 206 through the fitting 208, such as an electric current or a heat flow. The plate 302 thus constitutes a screen, preventing disturbances (current, heat) from reaching the fuselage 101.

The head of the screw 304*a* does not pass through the fuselage 101 and it is integrated in the plate 302 such that said head is flush with the second face 302*b* of the plate 302 and does not extend beyond it.

The screws 304*a* and the nuts 304*b* of the fastening bolts 304 make it possible to fasten the plate 302 to the fitting 208 and therefore to the element 206 without passing though the fuselage 101, the plate 302 being fastened to the fuselage 101 by the screws 306*a* and nuts 306*b* of the bolts 306.

For example, in the case in which the element 206 is a skid, the plate 302 is advantageously constituted of a material that is arranged to limit the passage of heat and thus heating of the skid will lead to limited heating of the fuselage 101. Such a material thus acts as a thermal insulator, and it can be made of mica, glass fiber reinforced polymers, titanium alloy, carbon fiber reinforced polymers, etc.

For example, in the case in which the element 206 is a pipe liable to receive a lightning strike that could induce a current in the pipe and in the fitting 208, in particular when it is a metal fitting, the plate 302 is advantageously constituted of a material that is arranged to prevent the passage of the current and thus a lightning strike does not reach the fuselage 101. Such a material thus acts as an electrical insulator, and it can be made of ABS, glass fiber reinforced polymers, etc.

As a result of the presence of the belly fairing 202, the bolts 306 cannot be reached directly by a potential lightning strike.

According to one particular embodiment, the plate 302 has a minimum electrical resistance of 1 ohm.

Figure 6:
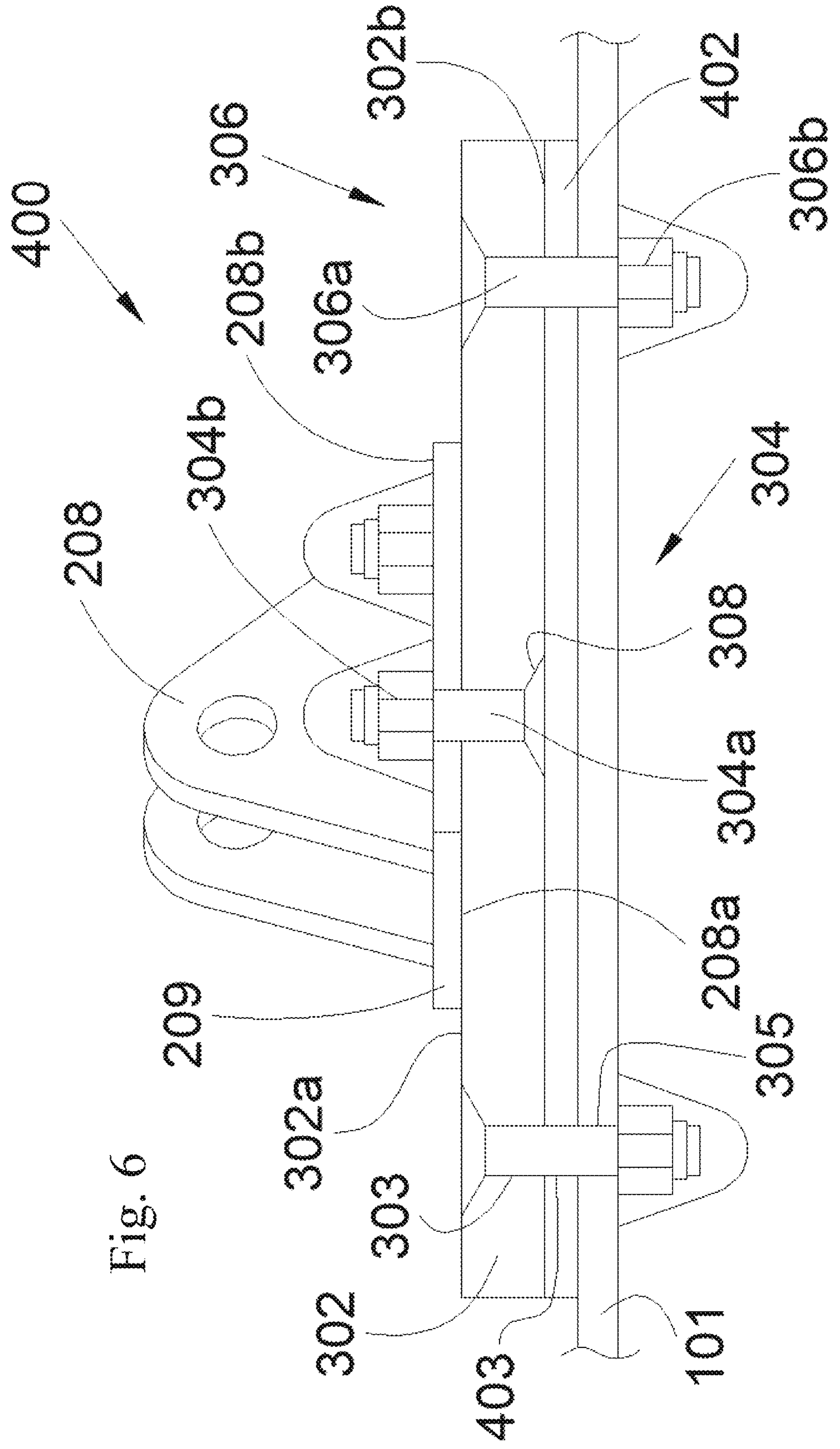
FIG. 6 is a view in cross section along the line V-V in FIG. 4 of an attachment system according to a second embodiment of the invention.

FIG. 6 shows an attachment system 400 according to a second embodiment of the invention. FIG. 4 also corresponds to the attachment system 400 according to the second embodiment of the invention. Elements identical to the first embodiment bear the same references.

In order to further limit the passage of any electric currents between the fitting 208 and the fuselage 101, the attachment system 400 has an intermediate plate 402 that is disposed between the second face 302*b* of the plate 302 and the fuselage 101, so as to separate the heads of screw 304*a* of each fastening bolt 304 from the fuselage 101. The intermediate plate 402 is thus against the second face 302*b* of the plate 302 on one side and against the fuselage 101 on the other side.

For each bolt 306, the intermediate plate 402 has a through-bore 403 into which the screw 306*a* of said bolt 306 is introduced.

Although this second embodiment is more particularly suitable in the case of induced currents, it can be implemented for the case relating to heat transfer.

Depending on the circumstances, the intermediate plate 402 is constituted of the same material as the material constituting the plate 302, i.e. a thermally insulating material or an electrically insulating material.

In the embodiments of the invention that are presented in FIGS. 5 and 6, each nut 304*b*, 306*b* is covered with a cap 310 made of an electrically insulating material, such as ABS, glass fiber reinforced polymers, etc.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:

a fuselage, an element and at least one attachment system for fastening the element to the outside of said fuselage, the attachment system having:

-a plate having a first face and a second face oriented towards the fuselage, and wherein the plate is fastened to said fuselage, a metal fitting fastened to said element and having a shoe with a contact face in contact with the first face, and at least one fastening bolt having a screw and a nut, wherein a head of the screw is housed in the plate on the side of the second face such that the head is flush with the second face and does not extend beyond the second face and wherein the nut is screwed to the screw, sandwiching the plate and the shoe of the fitting, wherein the at least one fastening bolt sandwiches the plate and the shoe without passing through the fuselage, and the plate is fastened to the fuselage by a plurality of bolts that pass through the plate and the fuselage.

2. The aircraft according to claim 1, wherein the plate comprises an electrically insulating material arranged to prevent a passage of current.

3. The aircraft according to claim 1, wherein the plate comprises a thermally insulating material arranged to limit a passage of heat.

4. The aircraft according to claim 1, further comprising:

an intermediate plate disposed against the second face of the plate and configured to be disposed against the fuselage.

5. The aircraft according to claim 4, wherein the intermediate plate comprises the same material as a material constituting the plate.

6. The aircraft according to claim 1, wherein the plate is fastened to the fuselage by a plurality of bolts, wherein each bolt has a screw with a head and a nut, wherein, for each bolt, the plate has a through-piercing and the fuselage has a through-orifice aligned with the piercing, wherein, for each bolt, the screw of said bolt passes through a piercing and an associated through-orifice so as to sandwich the plate and the fuselage between the head of the screw of said bolt and the nut of said bolt, and wherein the piercings of the plate are arranged such that there is no contact between the shoe and the heads of the screws.

7. The aircraft according to claim 6, wherein the plate is wider than the shoe and the piercings are on an outside of and at a distance from the shoe.

8. The aircraft according to claim 1, wherein the plate includes a countersunk hole on the side of the second face, and the head of the screw is received in the countersunk hole such that the head is flush with the second face.

9. The aircraft according to claim 1, wherein the nut is covered with a cap made of an electrically insulating material.

10. An aircraft comprising:

a fuselage, an element and at least one attachment system for fastening the element to the outside of said fuselage, the attachment system having:

a plate having a first face and a second face oriented towards the fuselage, and wherein the plate is fastened to said fuselage, a metal fitting fastened to said element and having a shoe with a contact face in contact with the first face, at least one fastening bolt having a screw and a nut, wherein a head of the screw is housed in the plate on the side of the second face and wherein the nut is screwed to the screw, sandwiching the plate and the shoe of the fitting, and an intermediate plate disposed against the second face of the plate and configured to be disposed against the fuselage.

* * * * *